United States Patent [19]

Müller et al.

[11] Patent Number: 4,618,759

[45] Date of Patent: Oct. 21, 1986

[54] BEAM POSITION CONTROL FOR A LASER MACHINE DEVICE

[75] Inventors: Gerhard Müller, Aalen; Gerhard Hohberg, Oberkochen; Peter Greve, Essingen, all of Fed. Rep. of Germany

[73] Assignee: Carl-Zeiss-Stiftung, Heidenheim, Fed. Rep. of Germany

[21] Appl. No.: 701,167

[22] Filed: Feb. 13, 1985

[30] Foreign Application Priority Data

Feb. 24, 1984 [DE] Fed. Rep. of Germany ....... 3406677

[51] Int. Cl.⁴ .............................................. B23K 27/00
[52] U.S. Cl. ..................... 219/121 LR; 219/121 LU; 219/121 LV; 219/121 L; 219/121 LZ; 356/152
[58] Field of Search ................. 219/121 LC, 121 LX, 219/121 LV, 121 LU, 121 LW, 121 LP, 121 LM, 121 LS; 356/152, 138, 400; 350/6.1, 6.5, 6.6

[56] References Cited

U.S. PATENT DOCUMENTS

| | | | |
|---|---|---|---|
| 3,902,036 | 8/1975 | Zaleckas | 219/121 LX |
| 4,289,378 | 9/1981 | Remy et al. | 219/121 LV |
| 4,429,211 | 1/1984 | Carstens et al. | 219/121 LX |
| 4,503,313 | 3/1985 | Tsutsumi | 219/121 LV |

FOREIGN PATENT DOCUMENTS

| | | | |
|---|---|---|---|
| 0102695 | 8/1979 | Japan | 219/121 LX |
| 0004393 | 1/1982 | Japan | 219/121 LV |
| 2040074 | 8/1980 | United Kingdom | 219/121 LX |
| 2083217 | 3/1982 | United Kingdom | 219/121 LX |

Primary Examiner—M. H. Paschall
Attorney, Agent, or Firm—Walter Ottesen

[57] ABSTRACT

The invention is directed to an arrangement for compensating for offset and angular errors of a laser coupled into a processing machine or measuring machine. The laser is mounted separately from the machine. The arrangement includes two adjustable mirrors by means of which the beam position at the coupling point is maintained constant. The corrective signal is generated by quadrant detectors cooperating with the adjustable mirrors arranged in the path of the laser beam. The detectors are arranged to receive rays of light diverted from the path of the laser beam. One of the detectors is preceded by a collimator causing the detector to respond only to angular errors.

7 Claims, 5 Drawing Figures

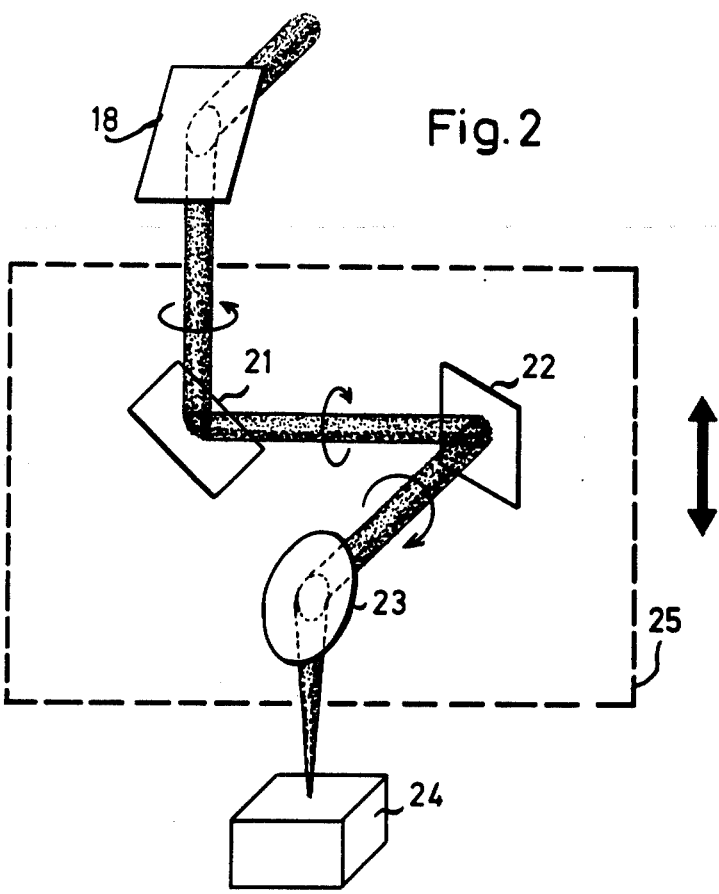
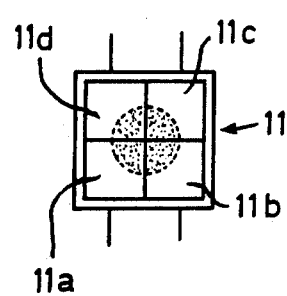
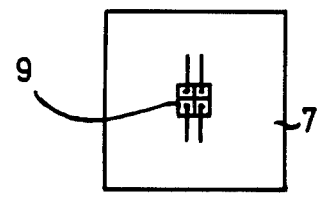

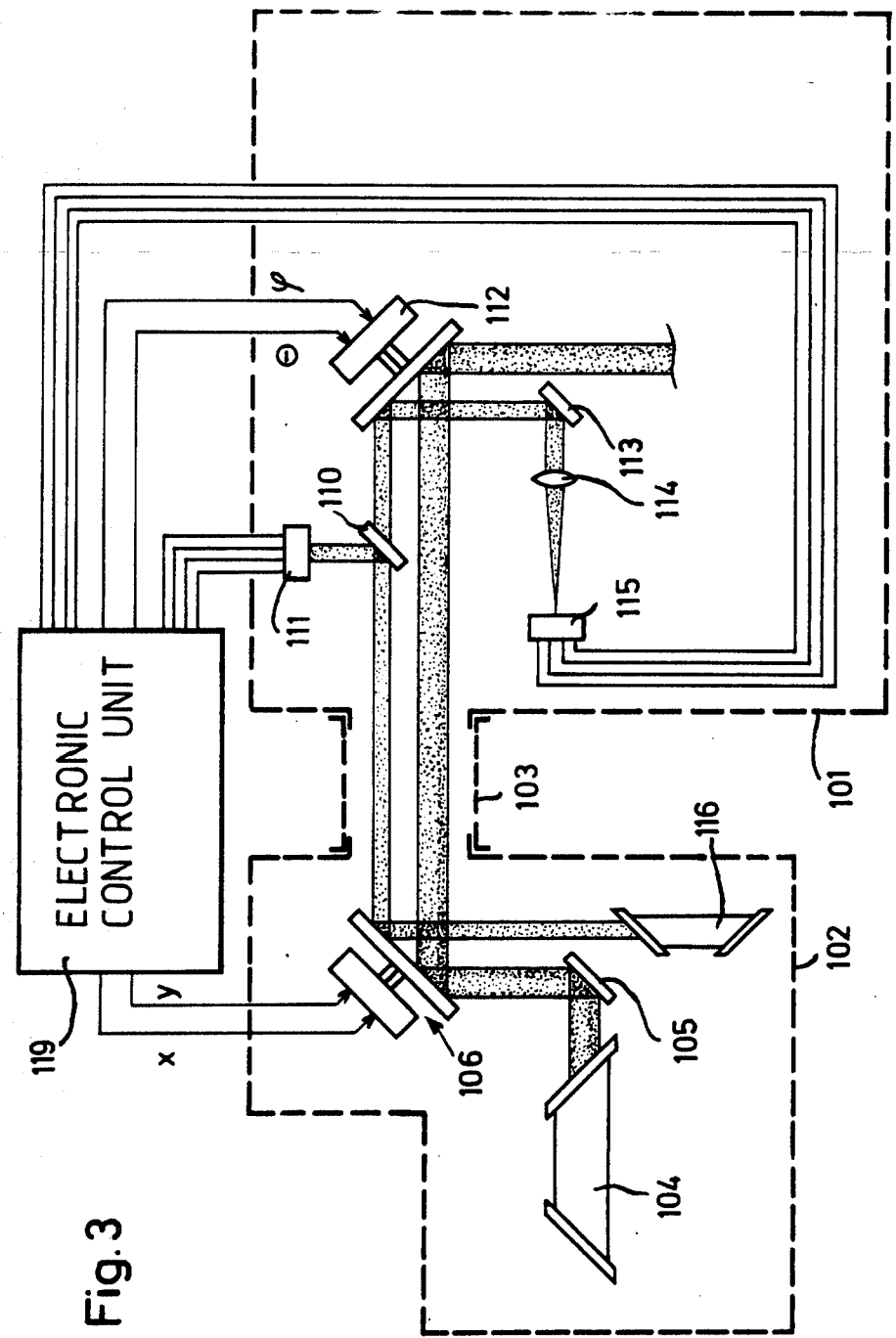

BEAM POSITION CONTROL FOR A LASER MACHINE DEVICE

BACKGROUND OF THE INVENTION

For guiding laser beams, it is customary to use either light conductors in the form of flexible glass fibers or transmission systems containing optical deflectors such as mirrors. Particularly for the processing of materials using powerful carbon-dioxide lasers, transmission systems of the above-mentioned type are utilized exclusively because so far no fiber cables are known that provide a sufficiently low-loss transmission in the wavelength range of a carbon-dioxide laser.

The vast majority of known laser machine tools are used for cutting or welding plane workpieces such as sheet metal. In these machines, the laser including its system for beam guidance and focusing is stationary while the workpiece is horizontally moved under the cutting head focusing the laser beam; this movement is in two directions in accordance with the desired contour. A machine of this type is described in U.S. Pat. No. 4,403,134, for example.

On the other hand, devices for laser processing and operating on the basis of conventional machine tools are also known, for example, from German published patent application DE-OS No. 3,226,448, where the cutting head itself is movable in several coordinates. In these devices, the laser generator is installed adjacent to the actual machine tool and its beam is directed along the axes of the machine tool via mirrors coupled to the movable machine parts.

If the laser generator is installed adjacent to the actual machine tool as a separate unit, problems then arise regarding its exact coupling into the beam guidance system of the machine. Relative movements between generator and machine as a result of, for example, vibrations in the foundation, temperature variations, et cetera, can cause an excursion or wandering of the laser beam. Because the position of the focus changes thereby, faulty working results. In the event of larger deviations, the case may even occur that the laser impinges on the mountings of its focusing optics, which, in the case of high-performance lasers having a power of several kilowatts, will inevitably destroy them.

In laser systems for reading out the contents of information storage plates, it is known to provide control arrangements which guide the focus of the laser beam radially along a predetermined track. In this connection, reference may be had to German Pat. No. 26 30 381. However, the control arrangements for such low-power laser systems evaluate the deviation of the focus from the visibly marked data track. Control arrangements operating on this basis are of no use for laser manufacturing processes. In these processes, it is sufficient to correct deviations of the focus position by a recalibration between the working steps as is described in German published patent application DE-OS No. 31 34 556.

SUMMARY OF THE INVENTION

It is an object of the invention to provide a control arrangement for a laser beam which is directed via deflecting optics and is coupled particularly into a machine tool. With this control arrangement, relative movements at the cutting location between the laser generator and the beam guidance system are automatically compensated.

This object is achieved in the arrangement of the invention in that the positions of at least two of the deflecting components for deflecting the laser beam along the beam path are controllable by a control unit, and in that the deflecting components are provided with position-sensitive, photoelectric detectors which receive rays diverted from the beam path at a location downstream of adjustable deflecting components. The signal outputs of the detectors are connected to a control unit for generating control signals for adjusting the two deflecting components.

The invention makes use of the realization that, as a rule, the laser beam can be guided with sufficient precision via mirror elements fixedly connected with a processing machine, for example, provided that the laser beam is coupled into the beam guidance system of the machine always in the same position with regard to both offset and angular displacement. This is ensured by at least two controllable deflecting components arranged in front of the input of the beam guidance system. One deflecting component serves to compensate for radial beam offset; whereas, the second deflecting component compensates for angular errors, including angular errors introduced by the first beam deflecting component.

It is an advantage to separate the two positional errors already before the control signal is obtained in order to prevent hunting caused by the competition of loops that are not decoupled. This is accomplished by inserting a collimator in front of the second position-sensitive detector, because in the collimator arrangement, the position of the focus is only affected by angular errors, not by offset.

The use of the control arrangement of the invention reduces the requirements with regard to accurately maintaining the relative adjustment between a separate laser unit and the machine tool operating with the laser, so that the provisions for mechanical and thermal stabilization can be less complex. This is an advantage particularly if one laser generator is to serve several machines.

Because of the difficulty of inserting the decoupling elements directly into the beam of a powerful work laser, it is suitable to provide an auxiliary laser beam in which the decoupling elements are arranged. This auxiliary laser beam is parallel to, yet not coaxial with, the beam of the work laser. For this purpose, a pilot laser, for example, may be used which is anyway available to mark the invisible focus of the work laser.

Further advantageous embodiments of the invention will become apparent from the subsequent description, the drawing and the appended claims.

BRIEF DESCRIPTION OF THE DRAWING

The invention will now be described with reference to the drawing wherein:

FIG. 2 is a perspective schematic of the beam path in the laser processing head of the machine of FIG. 1;

FIG. 3 is a schematic of a second embodiment of the invention and shows the beam path of a laser coupled into a machine tool or measuring machine;

FIG. 4 is a detail schematic of the position-sensitive detectors utilized in the embodiments of FIGS. 1 and 3; and, FIG. 5 is a detail schematic of the adjustable mirrors utilized in the embodiments of FIGS. 1 and 3.

DESCRIPTION OF THE PREFERRED EMBODIMENTS OF THE INVENTION

Figure 1:
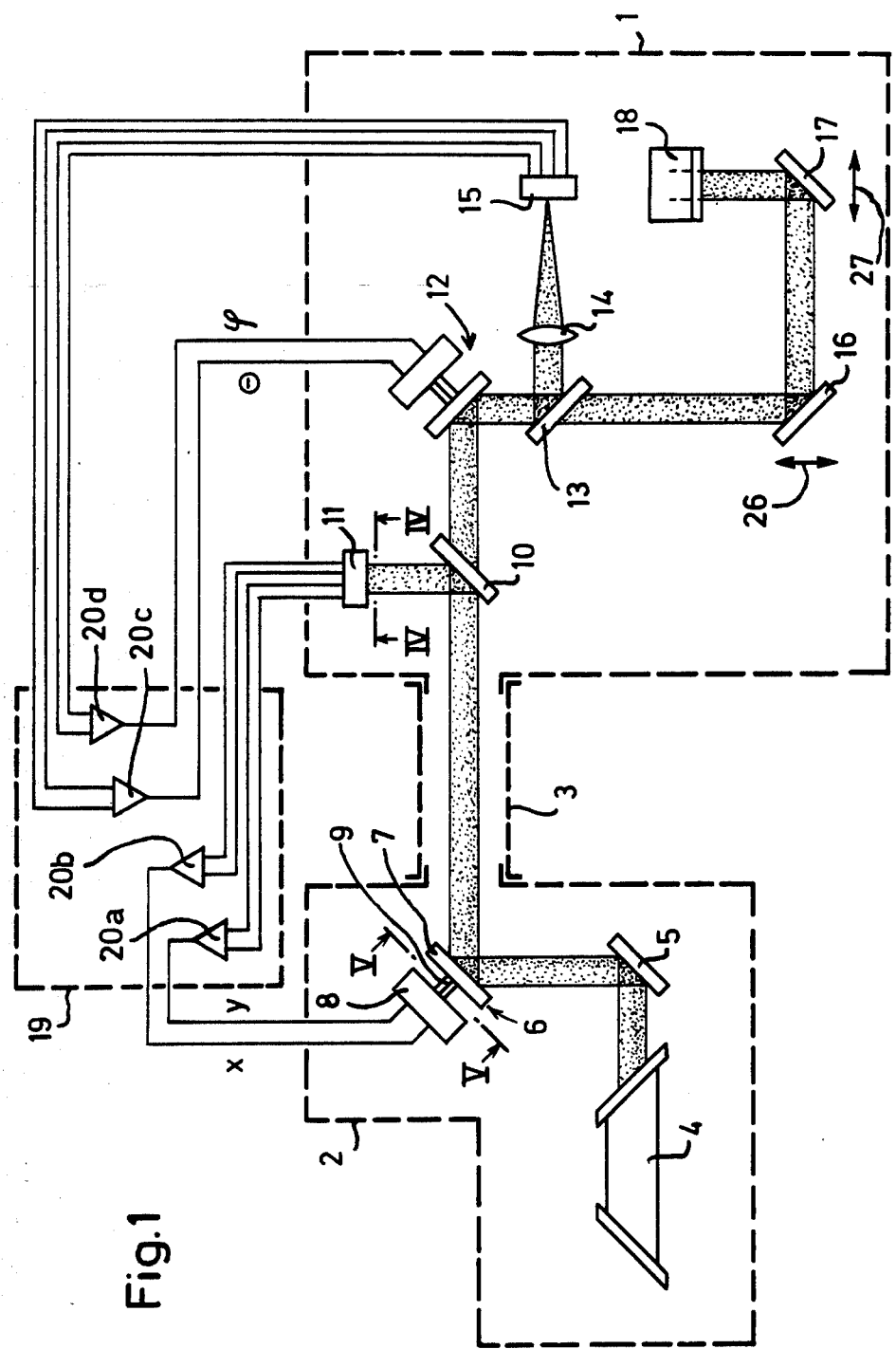
FIG. 1 a schematic of a laser coupled into a processing machine or measuring machine according to a first embodiment of the invention.

Referring now to the schematic of FIG. 1, the broken lines identified by reference numeral 1 enclose a beam guidance system fitted to a processing machine or measuring machine. Reference numeral 2 identifies the housing of a high-performance carbon-dioxide laser 4 installed separately from the machine 1. A protective tube 3 interconnects the housing 2 and the machine 1 whereat the laser beam is coupled into the machine 1.

Within the housing 2 of laser 4, the laser beam is guided via a deflection mirror 5 as well as via a beam deflector in the form of an adjustable mirror 6 arranged at the output of the housing 2. The angle of deflection of the mirror 6 is adjustable in a small angular range by a piezoelectric bending element 9 connecting the mirror face 7 with its mount 8.

As shown in FIG. 5, the piezoelectric bending element 9 is made up of four individually actuable piezo elements. If mutually adjacent elements or pairs of elements are actuated in opposite directions, the bending element 9 will bend similar to a bimetallic strip thereby moving the mirror 7 with its surface normal by a small angle relative to the incident beam. The magnitude and direction of the angle of movement of the mirror 7 depends on the voltage applied to the piezo elements.

Mirror 7 reflects the laser beam through protective tube 3 onto a second adjustable mirror 12 arranged on the input side of the beam guidance system of the processing machine or measuring machine 1. The configuration of mirror 12 is the same as for adjustable mirror 6.

The beam guidance system within machine 1 essentially comprises plane mirrors 16 and 17 correlated to the individual displacement axes of the machine and secured to the movable machine parts as indicated by the arrows 26 and 27, respectively. Reference numeral 18 denotes another mirror by means of which the beam is guided in the vertical direction to the laser processing head 25 illustrated in FIG. 2, the laser processing head 25 being adjustable in elevation.

The laser processing head 25 includes two plane mirrors 21 and 22 and a parabolic mirror 23 via which the beam is focused on the workpiece 24 to be processed. Each of the mirrors 21, 22 and 23 and the optics immediately following the same are pivotable about the axis of the beam incident thereon. The angle at which the laser beam impinges on workpiece 24 is freely adjustable by appropriately rotating mirrors 22 and 23. In addition, by rotating the entire head 25, it is possible to adjust the direction of polarization of the laser beam. For best cutting results, this direction should correspond with the direction of the cut.

As mentioned initially, vibrations in the machine foundation or thermal movement between the separate laser generator 2 and the machine 1 can cause the laser focus to deviate from its adjusted position. To prevent this, a beam splitter 10 is mounted on the input side of the beam guidance system of the machine 1 which reflects a small fraction of the laser beam in the form of a component beam onto a position-sensitive photoelectric detector 11. Detector 11 is a so-called quadrant detector and is shown in FIG. 4. The photosensitive surface of detector 4 is subdivided into individual quadrants which issue identical signals only if the reflected component beam impinges thereon exactly centrically.

The outputs of detector 11 are connected to an electric circuit 19 wherein the difference of the signals of diagonally adjacent quadrants is amplified by two operational amplifiers 20a and 20b, for example. The control signal thereby obtained is used to pivotally adjust mirror 6. Because of the relatively large spatial distance between adjustable mirror 6 and the coupling point in machine 1 in whose vicinity detector 11 is arranged, even small angular adjustments of the mirror 6 suffice to correct the spatial position of the laser beam in the direction of x and y. Accordingly, the control circuit thus formed ensures that the beam of the laser 4 is coupled into the machine invariably at the same position independently of offset between generator housing 2 and machine 1.

Apart from the correction of the beam offset as described, it is also necessary for the angular position at which the beam is coupled into the machine 1 to be maintained constant. It is to be noted that fluctuations in the angular position likewise affect the position of the focus, the effect being even more intense the longer the follow-on optical path between the coupling point and the focus.

The second adjustable mirror 12 and a second photoelectric detector 15 coact to correct the angular position. A small fraction of the laser beam split off by a beam splitter 13 impinges on the detector 15. The beam splitter 13 is arranged behind adjustable mirror 12 when viewed in the direction of the beam. Detector 15 has the same configuration as detector 11 and its outputs are likewise connected to control circuit 19 wherein the control signal is generated for the follow-on correction of the angular position of the laser beam in angles $\theta$ and $\alpha$ (FIG. 1) by means of adjustable mirror 12. The control circuit 20 is shown in simplified representation in FIG. 1 by means of two further operational amplifiers 20c and 20d.

A collimator 14 is arranged between beam splitter 13 and the quadrant detector 15. The collimator arrangement ensures that detector 15 responds solely to angular changes of the laser beam, because the position of the focus in the collimator arrangement as established by detector 15 is invariant relative to the offset of the beam in x or y.

Thus, the two control circuits 10-11-20ab-6 and 13-14-15-20cd-12 are decoupled from each other so that the possibility of hunting as a result of two concurrent circuit loops is completely obviated.

FIG. 3 shows another embodiment of the invention. It also utilizes a powerful processing laser 104 mounted in a separate housing 102 on vibration dampers (not shown) adjacent to the processing machine or measuring machine 101. The laser beam is to be coupled into the beam guidance system of the machine 101.

Two controllable mirrors 106 and 112 serve to correct offset and angular changes of the beam of the work laser 104 guided by these mirrors. Unlike the embodiment of FIG. 1, however, the offset and angular position are not controlled by reflecting a component beam out of the beam of the work laser beam via beam splitters and detecting the same. Instead, a supplementary pilot laser 116, which is likewise arranged in housing 102, is used whose beam is also directed via deflection mirrors 106 and 112 and is parallelly displaced with respect to the beam of work laser 104.

A beam splitter 110 is arranged in front of adjustable mirror 112 at the input side of the optical guidance system of machine 101 and reflects a component of the beam of the pilot laser 116 onto a quadrant detector 111 to obtain the control signal for correcting of the beam offset. After being deflected by adjustable mirror 112, the remaining part of the pilot beam impinges on a positionally fixed mirror 113 which is followed successively by a collimator 114 and a second quadrant detector 115 for determinating angular errors.

Both detectors 111 and 115 are connected to the electronic control unit 119 which processes the detector signals to generate the control voltage for positioning the adjustable mirrors. The beam guidance system for the further course of the beam of the work laser 104 in machine 101 is not shown as this has already been explained with reference to FIGS. 1 and 2.

By using the pilot laser 116 for obtaining the control signal, the beam of the work laser 104 is kept free of optical transmission systems. This is particularly important with infrared lasers of high power density because beam splitters with sufficiently good transparency in the wavelength range of, for example a carbon-dioxide laser, are difficult to realize.

In the embodiments of both FIG. 1 and FIG. 3, the offset of the work laser is compensated for by an angular follow-on adjustment utilizing an adjustable mirror arranged in the proximity of the laser. The angular error thereby introduced is corrected together with other incidental angular errors by a second mirror arranged at the input of the processing machine or measuring machine. Without departing from the scope of the invention, it is also possible to substitute translationally functioning deflecting elements for the rotationally functioning mirrors 6 and 106 in order to correct the beam offset.

It is understood that the foregoing description is that of the preferred embodiments of the invention and that various changes and modifications may be made thereto without departing from the spirit and scope of the invention as defined in the appended claims.

What is claimed is:

1. Arrangement for compensating for the excursion of a laser beam guided along a predetermined path line by a deflecting optical system made up of a plurality of deflecting components for deflecting the laser beam, the arrangement comprising:

a first one of said deflecting components being configured so as to be changeable in position so as to alter and adjust the spatial position of said laser beam;
    a first photoelectric detector corresponding to said first deflections component and being configured so as to generate a first output signal indicative of the position of rays of light impinging thereon;
    means for generating a bundle of rays of light travelling parallel to said path line;
    first diverting means disposed downstream of said first deflecting component for diverting a first portion of the rays of said bundle away from said path line so as to impinge on said first detector;
    a second one of said deflecting components being configured so as to be changeable in position so as to alter and adjust the angular position of said laser beam;
    a second photoelectric detector corresponding to said second deflecting component and being configured so as to generate a second output signal indicative of the position of rays of light impinging thereon;
    second diverting means disposed downstream of said second deflecting component for diverting a second portion of the rays of said bundle away from said path line so as to impinge on said second detector; and,
    a control unit for receiving said first and second output signals and for generating respective control signals corresponding thereto, said control signals being supplied to said first and second deflecting components to change the respective position thereof to compensate for said excursion by correcting the spatial and angular positions of said beam; and,
    said second deflecting component and said second diverting means both being disposed downstream of said first one of said deflecting components whereby said second deflecting component also compensates for angular errors introduced by said first deflecting component.

2. The arrangement of claim 1, said second deflecting component being disposed downstream of said first deflecting component and said arrangement further comprising light collimating means disposed between said second diverter means and said second detector so as to cause said second detector to respond only to angular changes of said laser beam.

3. The arrangement of claim 2, said first and second deflecting components including respective mirrors for deflecting said laser beam.

4. The arrangement of claim 1, said generating means being an auxiliary laser for generating said bundle of rays, said bundle of rays being an auxiliary laser beam, said first and second diverting means being first and second beam splitters for splitting off said first and second portions of said rays of said auxiliary laser beam.

5. The arrangement of claim 4, said auxiliary laser beam being disposed in spaced parallel relationship to said first-mentioned laser beam.

6. The arrangement of claim 1, wherein the laser beam is guided along the displacement axes of a machine selected from the group consisting of a measuring machine and a processing machine, and wherein said laser beam is developed by a generator mounted outside of said machine.

7. Arrangement for compensating for the excursion of a laser beam generated by laser generating means, the laser beam being guided along a predetermined path line by a deflecting optical system made up of a plurality of deflecting components for deflecting the laser beam, the arrangement comprising:

a first housing for accommodating said laser generating means therein;
    a first one of said deflecting components being mounted in said first housing and being configured so as to be changeable in position to alter and adjust the spatial position of said laser beam;
    a laser machine adapted for receiving said beam;
    a second housing for accommodating said laser machine therein, said second housing defining an inlet through which the laser beam enters;
    a first photoelectric detector corresponding to said first deflecting component and being mounted in said second housing in the vicinity of said inlet thereof, said first photoelectric detector being configured so as to generate a first output signal indicative of the position of rays of light impinging thereon;

said laser generating means including means for generating a bundle of rays of light travelling parallel to said path line;

first diverting means disposed in said second housing in the vicinity of said inlet thereof downstream of said first deflecting component for diverting a first portion of the rays of said bundle away from said path line so as to impinge on said first detector;

a second one of said deflecting components being mounted in said second housing and being configured so as to be changeable in position so as to alter and adjust the angular position of said laser beam;

a second photoelectric detector corresponding to said second deflecting component and also being mounted in said second housing, said second photoelectric detector being configured so as to generate a second output signal indicative of the position of rays of light impinging thereon;

second diverting means mounted in said second housing and disposed downstream of said second deflecting component for diverting a second portion of the rays of said bundle away from said path line so as to impinge on said second detector; and, a control unit for receiving said first and second output signals and for generating respective control signals corresponding thereto, said control signals being supplied to said first and second deflecting components to change the respective positions thereof to compensate for said excursion by correcting the spatial and angular positions of said beam; and, said second deflecting component and said second diverting means both being disposed downstream of said first one of said deflecting components whereby said second deflecting component also compensates for angular errors introduced by said first deflecting component.

* * * * *

UNITED STATES PATENT AND TRADEMARK OFFICE
CERTIFICATE OF CORRECTION

PATENT NO. : 4,618,759
DATED : October 21, 1986
INVENTOR(S) : Gerhard Müller, Gerhard Hohberg and Peter Greve It is certified that error appears in the above-identified patent and that said Letters Patent is hereby corrected as shown below:

In the title of the invention, delete "MACHINE" and substitute -- MACHINING -- therefor.

In column 4, line 38: delete "$\alpha$" and substitute -- $\wp$ -- therefor.

In column 5, line 12: delete "determinating" and substitute -- determining -- therefor.

In column 5, line 56: delete "deflections" and substitute -- deflecting -- therefor.

Signed and Sealed this

Thirteenth Day of January, 1987

*Attest:*

DONALD J. QUIGG

*Attesting Officer*     Commissioner of Patents and Trademarks